March 30, 1971  R. P. HABGOOD, JR., ET AL  3,573,148
PRESS FEED CHARGE COMPRISING WOOD CHIPS AND BINDER ENCASED
IN AN ENVELOPE HAVING SUFFICIENT STRUCTURAL INTEGRITY
TO RETAIN A DESIRED SHAPE WHEN FILLED
Original Filed Feb. 16, 1967

INVENTORS
Robert P. Habgood, Jr.,
Joseph N. Ianuzzi &
Robert W. Mericle

*their attorneys*

United States Patent Office 3,573,148
Patented Mar. 30, 1971

3,573,148
PRESS FEED CHARGE COMPRISING WOOD CHIPS AND BINDER ENCASED IN AN ENVELOPE HAVING SUFFICIENT STRUCTURAL INTEGRITY TO RETAIN A DESIRED SHAPE WHEN FILLED
Robert P. Habgood, Jr., Joseph N. Ianuzzi, and Robert W. Mericle, Bradford, Pa., assignors to AVM Corporation
Original application Feb. 16, 1967, Ser. No. 616,609. Divided and this application Apr. 3, 1969, Ser. No. 813,091
Int. Cl. B32b 1/00; B29j 5/02
U.S. Cl. 161—43
5 Claims

ABSTRACT OF THE DISCLOSURE

A press feeding article and method for wood chips and resin in which an enveloped, premeasured and predistributed charge is prepared for a press. The method comprises forming an envelope of preformed shape to contain a load of substantially non-flowable charge of preselected shape and distribution, loading the envelope with non-flowable charge, closing the envelope, placing the envelope in a mold and pressing to final shape.

---

This application is a division of my copending application Ser. No. 616,609, filed Feb. 16, 1967.

This invention relates to press feeding methods and apparatus and particularly to methods and apparatus for feeding wood flakes and like materials to presses for forming pressed articles of various shapes and densities.

In the manufacture of molded parts utilizing materials which do not possess good flow characteristics, very serious problems arise in controlling densities and even in the simple area of filling the mold cavities. The transfer and injection apparatus and methods commonly used in molding will not function with such materials. Moreover, the fact that flow is poor, may even militate against normal compression molding techniques. One of the materials where this problem is particularly acute is wood flakes for molding shaped articles and the invention will be discussed in detail in the context of wood flake molding.

In molding wood flakes, the problems of handling and distribution are such that normal compression molding techniques cannot be used and special techniques are necessary. The almost complete lack of flow characteristics in wood flake mixtures for molding requires that the molding charge be placed in the mold in precisely the spot where the material is desired. Loading is accordingly, a manual operation with a substantial degree of skill and "art" necessary on the part of the operator. For example, if a finished molded part is to have thick and thin areas, even of the same density, it requires that the wood flakes be stacked higher over the areas where the thickness is greater. This requires non-uniform loading or charging of the mold and considerable skill in the operator.

The present invention overcomes these problems of mold loading and distribution by preparing a load so that it can be quickly and easily placed in the mold. It further makes possible automatic feeding of parts to the press. It removes the element of "art" and provides a high degree of uniformity in the finished product. It cuts the costs of manufacturing by saving very expensive "press time" since the load is prepared away from the press and with very inexpensive equipment.

The essence of the invention is to pre-assemble the loose flakes into a formed "bag" or envelope which holds the flakes in a predetermined shape. This bag is sealed on its edges and has sufficient structural integrity to retain its desired shape. Since the density of the finished piece is known at each point in the piece then the topography of the bag will be predictable from a knowledge of the shape of the finished part, and the desired compression ratio at each location. This compression ratio can be varied from place to place in the part as desired.

There are several avenues which can be chosen in putting this system to practical use. They involve various choices of bag material and leave the user with product of various different uses. These will be discussed in detail below.

In a preferred practice and embodiment of our invention, we provide an enveloped premeasured and predistributed amount of charge fee to a press. Preferably the envelope is made of a material which can be deformed in the mold as molding progresses and which forms a part of the final molding or leaves the mold as a vapor. The envelope is preferably preformed to contain the desired charge in the desired preselected shape and distribution.

The method of our invention basically comprises the steps of:

(a) Forming an envelope of preformed shape such that it will contain a load of substantially non-flowable charge of preselected shape and distribution, (b) Loading said envelope with said substantially non-flowable charge, (c) Closing said envelope about said charge, (d) Placing the closed envelope and charge in a mold, and (e) Pressing said closed envelope and charge in said mold to final shape.

In the foregoing general statement of our invention we have set out certain objects, practices and advantages of our invention. Other objects, purposes and advantages of our invention will be apparent from the following description and the accompanying drawings in which.

Figure 1:
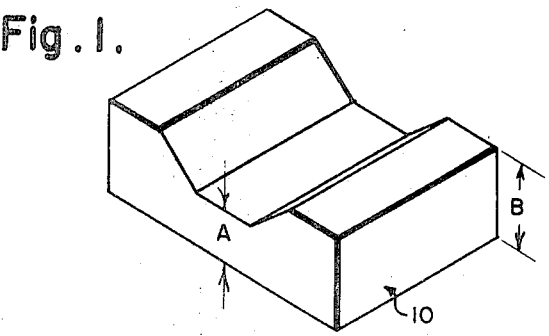
FIG. 1 shows an isometric view of a final end product to be molded.
Figure 3:
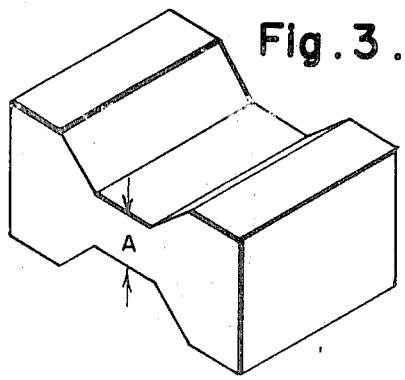
FIG. 3 shows an isometric view of a second form of final end product which might be molded from the envelope of FIG. 2.
Figure 2:
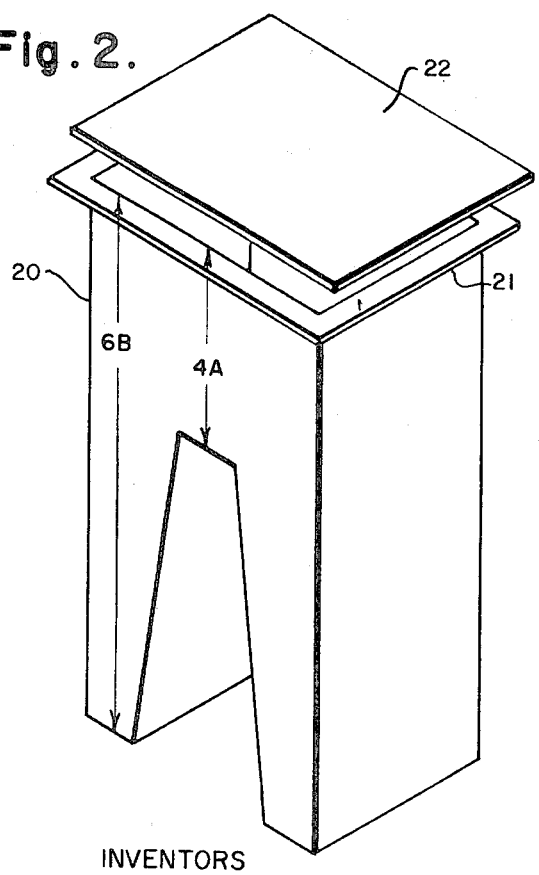
FIG. 2 shows an isometric exploded view of an envelope adapted to contain a loose charge of substantially non-flowable material for molding the product of FIG. 1.

Referring to the drawings we have illustrated in FIG. 1 a part 10 to be molded having two different thicknesses in the body portion $a$ and $b$. In FIG. 2 we have illustrated a bag or envelope 20 made of styrene and formed of a bottom 21 and top 22 which are fastened together after filling by stitching, heat sealing, solvent sealing, cementing, stapling, taping or any other suitable means. The bottom is formed on the assumption that the compression ratio in the thin area will be 4:1 and in the thick area 6:1. This requires that the thick areas $6b$ of the bag be six times as high as the final thick areas $b$ and the thin area $4a$ be only 4 times as thick as the thin areas $a$ of the final product.

Figure 4:
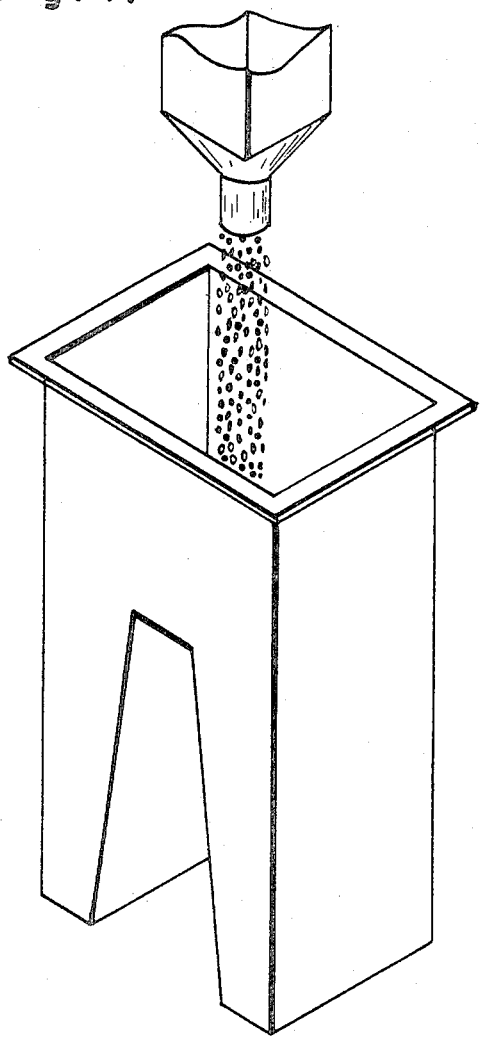
FIG. 4 shows an isometric view of the loading of the envelope of FIG. 2.

The dished or cupped portion of the envelope is preferably filled as shown in FIG. 4 and the flat portion of the envelope is then applied and fixed thereto. The filled bag is then inserted into the press mold and pressed to the final article 10.

By having one side of the "bag" flat as shown, only one sheet used in making it up need be given any shape. The second side can be perfectly flat. In use, the top sheet of the bag is preferably formed so that it is inside out, or rather the inside facing up, bowl fashion. This then makes a conveniently fillable container which can have flakes fed into it on a volumetric or on a weight basis (or on a combination of the two). The charge is then leveled with the edges of the sheet and a flat sheet is placed over and fastened at the edges. Fastening means will vary with the nature of the sheets and of the materials of which they are made. Such sheets can be stapled together, sewed, glued, heat sealed, or solvent sealed together, taped, folded, or clipped together, as the materials warrant.

There are three main classes of bags or envelopes which may be used in this invention. Each will be discussed separately below:

(1) DISINTEGRATING TYPE

Envelopes in this family are composed of materials which will not retain their integrity upon being exposed to the heat of pressing. This heat generally is in excess of 300° F. In envelopes of this type, the material dissociates upon exposure to these temperatures and either flashes as a vapor or melts to a liquid and in either case will either enter the mix or leaves the mold or both. In the case of certain materials such as styrenes, these flashed materials can actually accelerate the curing of some resins in the polyester family. (Styrene monomers accomplish this catalysis with Dow's "Derekane" resin.) Other materials for the envelope and basic resin system can probably be located to have similar action. In any event, even without such catalyzing action the use of an envelope which serves only to get the flake into the press, and then disintegrates, accomplishes the major objective, to provide an improved feeding means. Such shells can be made of uncured thermoset resins, or thermoplastic materials of cellophane, Mylar or other similar sheet materials.

(2) SUB-LAMINATE ENVELOPE

The term sub-laminate envelope here means that the envelope in this case is intended to become part of the finished core in an integral, identifiable way. That is, the envelope material is easily seen to be the outside covering of the finished core. In the final finishing of the product, another material will be applied as the outer coating. These outer coatings are our usual laminate systems such as melamine impregnated papers, "plexon" systems, natural veneers etc. Typical of such sub-laminate materials are phenolic resin impregnated paper ("core stock") crepe paper stock loaded with resin, and expandable papers which are not resin impregnated which will attain their bonding to the core by virtue of the resins mixed with the wood flakes.

(3) LAMINATE ENVELOPE

In this arrangement the envelope is also the final or outside cover of the finished product. It may be a utilitarian object in which case the envelope will provide, after being pressed, a stressed, high strength sheath that contributes to the structural strength or impact resistance of the part. For a decorative object, it may not only improve the structure, but may also have an attractive and decorative appearance and may be a print, simulated wood grain or any other appearance or material common to laminating techniques. In addition, this laminate envelope may consist of plain appearing papers such as core stock into which physical graining or patterning forms have been impressed and which can be finished by simple staining and glazing procedures.

While we have illustrated and described certain presently preferred practices and embodiments of our invention in the foregoing specification, it will be understood that this invention may be otherwise embodied within the scope of the following claims.

We claim:

1. As a new article, a mixture of wood chips and resin contained within a deformable envelope having sufficient structural integrity to retain a desired shape when filled to be fed into a press for compression in one direction into a final pressed form, said envelope having its dimensions in the direction of pressing varied in proportion to the combination of the final dimensions and the differential density desired at any given point in the final product, said wood chips and resin mixture being uniformly distributed within said rigid envelope.

2. An article as claimed in claim 1 wherein a preformed element of a material which forms a part of the final molded product is used to envelope said charge.

3. An article as claimed in claim 1 wherein a preformed element of a material which vaporizes at the molding temperature and pressure is used to envelope said charge.

4. An article as claimed in claim 2 wherein the preformed element forms a sub-laminate envelope over the charge.

5. An article as claimed in claim 2 wherein the preformed element forms the final laminate surface of the finished article.

References Cited

UNITED STATES PATENTS

| | | | |
|---|---|---|---|
| 2,975,089 | 3/1961 | Hargreaves | 161—124X |
| 3,378,612 | 4/1968 | Dietz | 264—328 |

FOREIGN PATENTS

| | | | |
|---|---|---|---|
| 913,034 | 12/1962 | Great Britain | 264—112 |
| 1,112,253 | 7/1959 | Germany | 264—317 |
| 1,152,245 | 5/1958 | Germany | 264—109 |
| 1,175,960 | 11/1958 | France. | |

JOHN T. GOOLKASIAN, Primary Examiner

J. C. GIL, Assistant Examiner

U.S. Cl. X.R.

156—245; 161—119, 124, 162, 168; 264—109, 112, 313, 317, 328